United States Patent
Pol et al.

(10) Patent No.: US 11,658,284 B2
(45) Date of Patent: May 23, 2023

(54) SODIUM POWDERS FOR USE AS ELECTRODE ADDITIVES AND METHODS OF MAKING AND USING THE SAME

(71) Applicant: Purdue Research Foundation, West Lafayette, IN (US)

(72) Inventors: Vilas Ganpat Pol, West Lafayette, IN (US); Jialiang Tang, Dallas, TX (US)

(73) Assignee: Purdue Research Foundation, West Lafayette, IN (US)

( * ) Notice: Subject to any disclaimer, the term of this patent is extended or adjusted under 35 U.S.C. 154(b) by 859 days.

(21) Appl. No.: 16/279,450

(22) Filed: Feb. 19, 2019

(65) Prior Publication Data

US 2019/0260010 A1 Aug. 22, 2019

Related U.S. Application Data

(60) Provisional application No. 62/632,946, filed on Feb. 20, 2018.

(51) Int. Cl.

| | |
|---|---|
| *H01M 4/1393* | (2010.01) |
| *H01M 4/04* | (2006.01) |
| *H01M 4/133* | (2010.01) |
| *H01M 4/587* | (2010.01) |
| *B22F 9/04* | (2006.01) |
| *H01M 10/054* | (2010.01) |
| *H01M 4/02* | (2006.01) |

(52) U.S. Cl.
CPC ............ *H01M 4/1393* (2013.01); *B22F 9/04* (2013.01); *H01M 4/0402* (2013.01); *H01M 4/133* (2013.01); *H01M 4/587* (2013.01); *H01M 10/054* (2013.01); *B22F 2009/045* (2013.01); *B22F 2301/054* (2013.01); *H01M 2004/027* (2013.01)

(58) Field of Classification Search
CPC ........................... H01M 4/134; H01M 10/399
See application file for complete search history.

(56) References Cited

U.S. PATENT DOCUMENTS

| | | | | |
|---|---|---|---|---|
| 2007/0154814 A1* | 7/2007 | Ryu | ..................... | H01M 10/399 429/321 |
| 2017/0324086 A1* | 11/2017 | Nitta | ..................... | H01M 4/134 |

\* cited by examiner

*Primary Examiner* — Khanh T Nguyen

(74) *Attorney, Agent, or Firm* — Purdue Research Foundation

(57) ABSTRACT

A method of producing metallic sodium powders. The method includes immersing one or more solid pieces of sodium metal in an organic liquid containing a hydrocarbon oil. The solid piece (s) of sodium metal immersed in the hydrocarbon oil is (are) then subjected to ultrasonic irradiation, wherein the solid piece of sodium metal is fragmented to form sodium powder, resulting in a dispersion of the sodium powder in the organic liquid. The dispersed sodium powder is then separated from the organic liquid, resulting in metallic sodium powder. A method of presodiation of an anode in an electrochemical cell. The method includes adding sodium metal powders to the surface of the anode either as a dry powder or as a suspension of the sodium particles in an organic liquid. An anode in an electrochemical cell containing metallic sodium particles. An electrochemical cell comprising a presodiated anode.

12 Claims, 14 Drawing Sheets

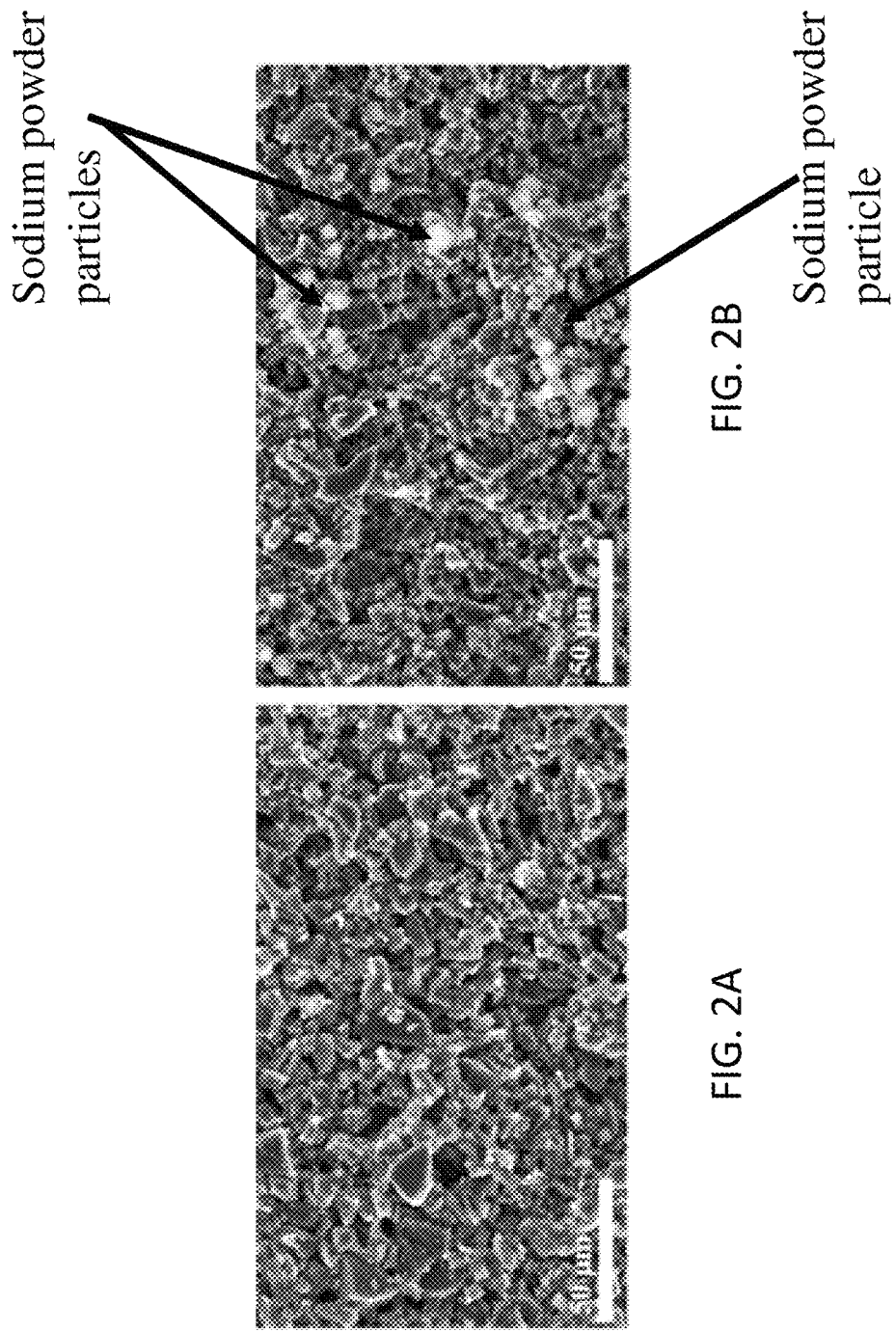

SODIUM POWDERS FOR USE AS ELECTRODE ADDITIVES AND METHODS OF MAKING AND USING THE SAME

CROSS-REFERENCE TO RELATED APPLICATIONS

The present U.S. patent application is related to and claims the priority benefit of U.S. Provisional Patent Application Ser. No. 62/632,946 filed Feb. 20, 2018, the contents of which are hereby incorporated by reference in their entirety into the present disclosure.

TECHNICAL FIELD

This disclosure relates to preparation and use of sodium powders, especially for use as electrode additives in electrochemical cells, especially sodium ion batteries.

BACKGROUND

This section introduces aspects that may help facilitate a better understanding of the disclosure. Accordingly, these statements are to be read in this light and are not to be understood as admissions about what is or is not prior art.

Battery researchers around the world have been developing sodium-ion batteries (SIBs) as an alternative rechargeable technology to lithium-ion batteries (LIBs). SIBs could potentially cost less than LIBs and be produced in larger scales for grid energy storage owing to the natural abundance of sodium resources. The analogous electrochemistry of SIBs to LIBs also enables the rapid development of a wide range of Na cathodes (e.g., Na-based layered metal oxides and polyanionic compounds), anodes (e.g., tin-based alloying materials and hard carbon) and electrolytes (e.g., $NaClO_4$ and Sodium Powder$F_6$ in combination of linear and cyclic carbonates).

Similar to LIBs, solid electrolyte interphase (SEI) growth on the anode surface remains a major challenge to SIBs. The formation of SEI comes from the unavoidable decomposition of electrolyte at lower potential during initial cycles (<1V). Excessive SEI buildup in the formation cycles or later cycles would consume electrolyte, deplete available alkaline ions, and increase cell polarization. Non-SEI related capacity loss due to irreversible Na adsorption at graphene/carbon defect sites and irreversible intercalation between graphene layers could also lead to low Coulombic efficiency in the first few cycles. In recent work on various promising carbon anode materials for SIBs, the first cycle Coulombic inefficiencies were seen to be 50% for scalable carbon sheets, 25.1%-41.6% for carbon particles, 60.3% for interconnected carbon network comprising electronegative fluorine, 32.7% for microporous carbon, and 38.0% for solid dense carbon spheres. Moreover, many review articles demonstrated high-capacity anodes and cathode materials with poor first cycle Coulombic efficiencies and continuous capacity fade.

Thus there exists an unmet need for materials and methods to enhance reversible capacities in SIBs to enable their large-scale adaptation.

SUMMARY

A method of producing metallic sodium powders is disclosed. The method includes immersing at least one solid piece of sodium metal in an organic liquid containing a hydrocarbon oil. The solid piece of sodium metal immersed in the hydrocarbon oil is then subjected to ultrasonic irradiation for a period of time, wherein the solid piece of sodium metal is fragmented to form sodium powder, resulting in a dispersion of the sodium powder in the organic liquid. The dispersed sodium powder is then separated from the organic liquid by a separation technique, resulting in metallic sodium powder.

A method of presodiation of an anode in an electrochemical cell is disclosed. The method includes adding sodium metal powders to the surface of the anode either as a dry powder or as a suspension of the sodium particles in an organic liquid.

An anode in an electrochemical cell containing metallic sodium particles is disclosed.

An electrochemical cell comprising a presodiated anode is disclosed.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

FIGS. 2A and 2B show GC 1100 electrode with and without sodium powder coating respectively.

DETAILED DESCRIPTION

Figure 1B:
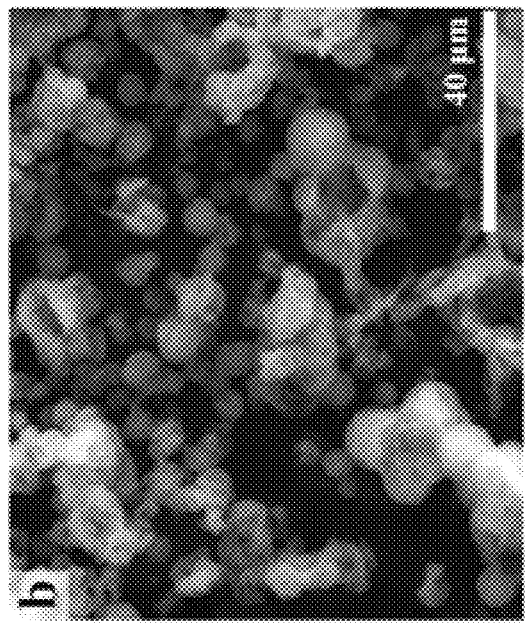
FIGS. 1A and 1B are SEM images of sodium powder of this disclosure at different magnifications.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

Excessive solid electrolyte interphase (SEI) buildup in the formation cycles or later cycles would consume electrolyte, deplete available alkaline ions, and increase cell polarization; the reduction in the amount of available alkaline ions upon cycling often results in low capacity and poor capacity retention in full cells. The issues with SEI growth described above become more prominent in full cells in which cathodes store limited amount of alkaline ions that are available for reversible cycling. The reduction in the amount of available alkaline ions upon cycling often results in low capacity and poor capacity retention in full cells. Some recent work highlighted the importance of anode pretreatment (via electrochemical pre-sodiation/pre-lithiation to supply additional alkaline ions) to enhance reversible capacities in SIB full cells (hard carbon/NaNi$_{0.5}$Mn$_{0.5}$O$_2$) and LIB full cells (hard carbon/LiNi$_{0.5}$Mn$_{0.5}$O$_2$).

In the context of this disclosure the term "sodiation" is used to mean formation of sodium in or on an electrode during an electrochemical reaction. In the context of this disclosure, the term "presodiation" or "pre-sodiation" is used to mean incorporation or addition of sodium into or onto an electrode prior to subjecting the electrode to an electrochemical reaction, by a method that does not involve an electrochemical reaction. An electrode subjected to pre-sodiation is termed presodiated electrode. (Note: an exception to this is a situation wherein an electrochemical reaction is utilized to incorporate sodium into an electrode and subsequently that electrode with incorporated sodium via an electrochemical a reaction is used in a subsequent electrochemical reaction. Such an electrode may also be termed as presodiated. But that would be an exceptions to the general context of this disclosure. In the context of this disclosure desodiation refers removal or depletion of sodium from an electrode during an electrochemical reaction. For example electrochemical removal of sodium from carbon anode can be termed desodiation. Thus providing sodium electrochemically to a carbon anode in an electrochemical cell is presodiation of the carbon anode. In sodiation and in pre-sodiation sodium is loaded in the gaps, cavities and surfaces of carbon layers of a carbon anode, wherein the sodium acts as an anode. Moreover, sodium powder could be added to metallic anodes such as Sn, Sb and P. Similarly, electrochemically inserting lithium into graphite structure in an electrochemical cell is called pre-lithiation. It should be recognized, according to this disclosure, that presodiation is not limited to an anode such as carbon electrode; presodiation can be utilized for a cathode, such as sodium containing cathode. In carbon based or metallic (Sb, Sn) anodes, presodiation provides required amount of sodium that is getting lost in the solid electrolyte layer formation in the first cycle. That way, we do not have to loose sodium from cathode side, which is limited yielding overall enhanced charge-discharge performance. Sodiation could be done electrochemically in the first cycle in an electrochemical cell. Presodiation could be electrochemically or without electrochemically just by providing additional sodium powder towards anode.

In light of these issues associated with SEI growth, several non-electrochemical pretreatment techniques of anodes have been developed. For LIBs, thermal alloying of Li with Si nanoparticles, Li-metal free pre-lithiation of Si in an electrolytic cells, and poly-methyl-methacrylate (PMMA) protected lithium metal as pre-lithiation agent have shown promises in mitigating the loss of Li due to SEI buildup. More noticeably, stabilized lithium metal powder (SLMP) developed by FMC corporation have demonstrated its feasibility as a commercial solution to prelithiate the anodes or cathodes without significant modification of the current battery making process. As to SIBs, a pre-sodiation technique via direct ball milling of sodium metal with cathode/anode materials under inert environment was recently reported.

In this disclosure, sodium-powder based presodiation techniques that could potentially be applied to both anode and cathode materials with minimal modification to conventional battery making process are described to compensate the Na loss from SEI formation. The synthesis of sodium powder is accomplished via ultrasonic dispersion of molten sodium metal in mineral oil. When suspended in hexane, the sodium powder can be easily applied onto electrodes as pre-sodiation additives. In the studies leading to this disclosure, GC1100 designates standard for glucose derived carbon at 1100° C., and CR2032 is a specific type of coin cell with dimeter of 20 mm and height of 3.2 mm. In the half cell study with glucose derived carbon (GC1100), pre-sodiation lowered initial open circuit cell potential (~1V drop) and reduces $1^{st}$ cycle irreversible Coulombic efficiency (from 19.3% to 8%). In the full cell study with GC1100 and NaCrO$_2$, pre-sodiation also lead to ~10% improvement in cycling capacity and ~5% increase in energy density. Smaller cell polarization is also observed in cells with pre-sodiation. Reduction in the first cycle loss and enhancement in reversible capacity are also observed with the application of sodium powder on carbon anodes in the studies leading to this disclosure.

Figure 6:
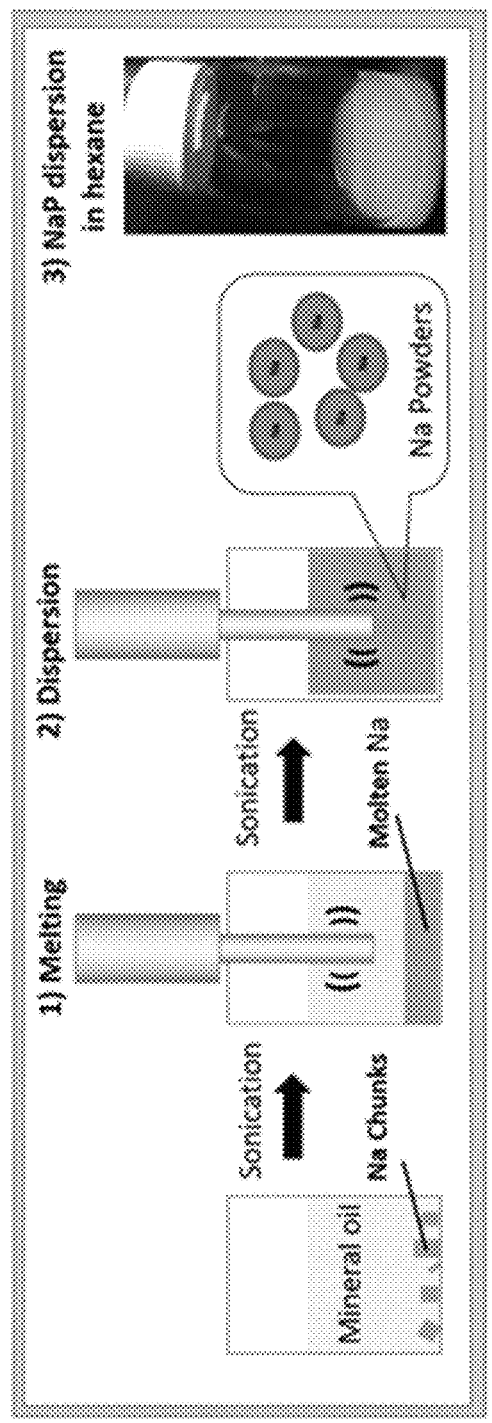
FIG. 6 shows a schematic representation of synthesis of sodium powders of this disclosure via pulsed ultrasonic melting, dispersion in mineral oil along with an image of sodium powder (NaP) stored in hexane after removal of mineral oil.

In experiments leading to the disclosure, sodium powders were prepared via ultrasonic heating, melting, and subsequent fragmentation of solid sodium chunks in an organic solvent. In this disclosure, sodium powder may be referred to as "Na powder", or "sodium powder" or "Sodium Powder" and in the corresponding plural form "Na powders", or "sodium powders" or "Sodium Powders". It should be understood that in the context of this disclosure, all the singular forms described above are synonymous and all the plural forms are synonymous. Ultrasonication was generated from a Sonics VCX500 probe equipped with a stepped microtip. In a typical synthesis, 15 mL of mineral oil was first degassed by ultrasonication for 15 mins inside a 150 mL cone-shape sonochemical reactions vessel; and then about 100 mg of fresh metallic sodium chunks were added into the oil. A continuous argon flow was fed to the vessel to maintain an air/moisture-free environment. The Na/oil mixture was then exposed to ultrasonic irradiation at 40% amplitude. Pulsed ultrasonic irradiation was applied in 4 cycles of 59s-sonication and 30s-rest intervals. The formation of sodium powder took place in two stages. At the $1^{st}$ stage, solid Na chunks were melted into liquid sodium when the mixture temperature rose above the melting temperature of sodium (98° C.). The temperature rise is a result of ultrasound induced heating to the oil. At the $2^{nd}$ stage, the molten Na particles were dispersed into mineral oil by ultrasound to form a homogenous mixture with purple coloration. Once cooled, the color changed to grey. The mixture was then washed with anhydrous hexane and centrifuged three times to obtain a dispersion of Na powder in clean hexane. All washing procedure except the centrifugation were completed inside Ar-filled glovebox to minimize air exposure. FIG. 6 shows a schematic representation of synthesis of sodium powders of this disclosure via pulsed ultrasonic melting, dispersion in mineral oil along with an image of sodium powder (NaP) stored in hexane after removal of mineral oil.

Figure 1A:
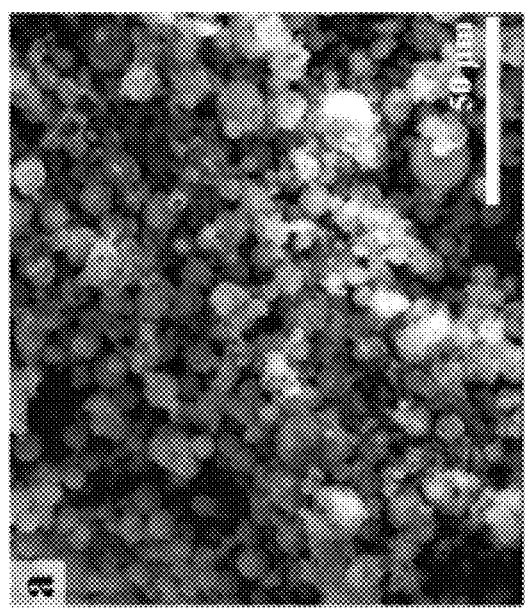
Figure 1D:
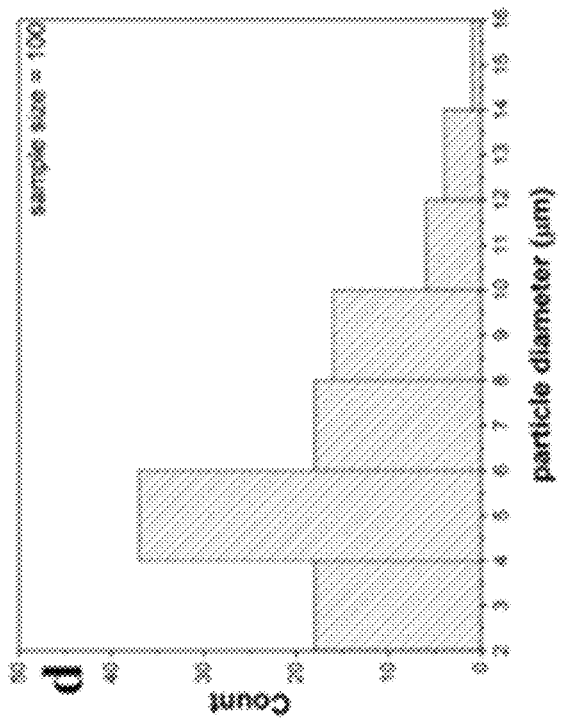
FIG. 1D shows particle size distribution of sodium powder shown in FIGS. 1A and 1B.
Figure 1C:
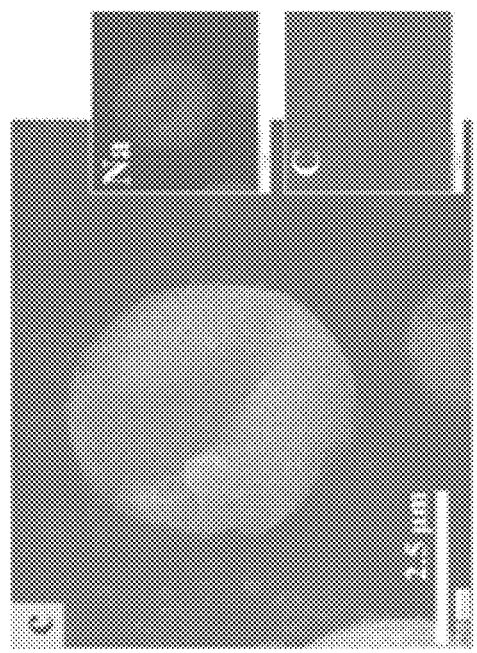
FIG. 1C shows EDX mapping of a single sodium powder particle.
Figure 1E:
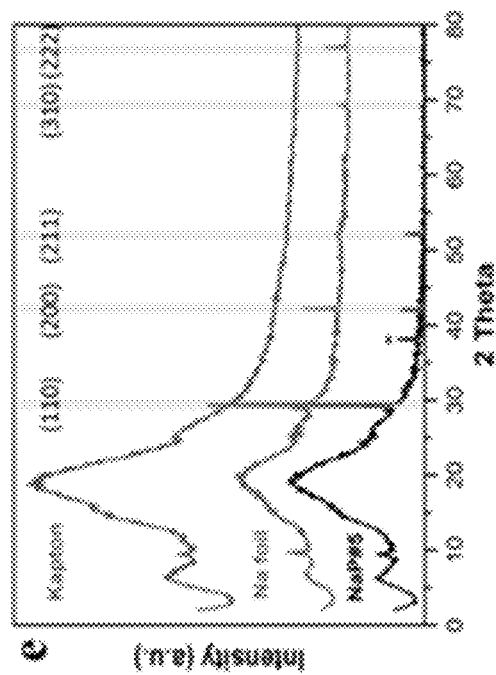
FIG. 1E shows XRD patterns of Kapton tape, Na foil, and Sodium Powder.
Figure 1F:
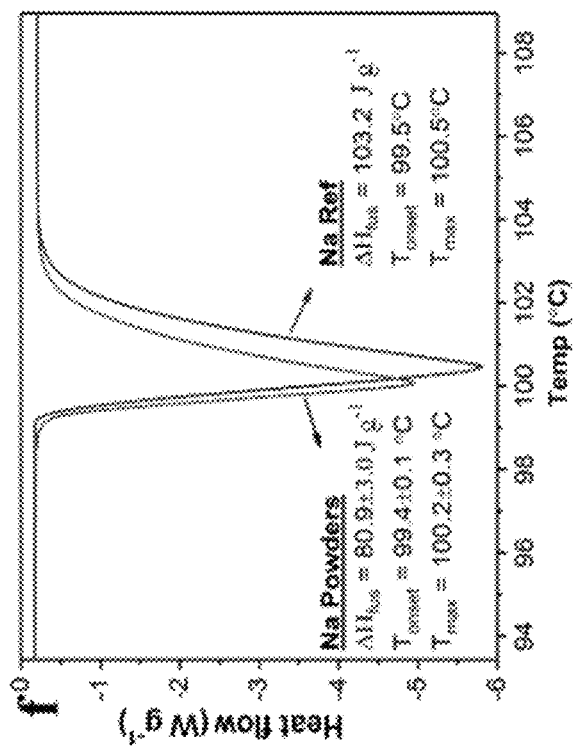
FIG. 1F DSC analysis of Sodium Powder and Na reference.

FIGS. 1A through 1F summarize the physical characterizations of as-prepared sodium powder of this disclosure. FIGS. 1A and 1B are SEM images of sodium powder of this disclosure at different magnifications. FIG. 1C shows EDX mapping of a single sodium powder particle. FIG. 1D shows particle size distribution of sodium powder shown in FIGS. 1A and 1B. FIG. 1E shows XRD patterns of Kapton tape, Na foil, and Sodium Powder. FIG. 1F DSC analysis of Sodium Powder and Na reference. Scanning electron microscopy (SEM) images of sodium powder reveal particle size range of 2-16 m with majority of the particles being less than 10 m in diameter. While majority of the particles appear spherical, minor irregular sheet-like particles are observed and may have resulted from localized rapid cooling (likely near the reactor wall) that prevents molten sodium particles from solidifying into preferable spherical shapes. SEM images of a batch of sodium powder prepared by applying rapid cooling to the sonication vessel during the last pulse sonication showed that the sodium powder particles exhibit predominately shell- and sheet-like morphologies, hence supporting the hypothesis of cooling-induced particle shape changes. Energy-dispersive X-ray (EDX) mapping of the individual Sodium Powder particle indicates the presence of sodium. Some carbon are also detected on Sodium Powder and could have its origin in air exposure of the Sodium Powder (forming $Na_2CO_3$) during sample loading. The fabrication of smaller particles is likely possible by reducing the sodium to mineral oil ratio in the reaction mixture and may be more desirable to provide better penetration into the porous electrodes, allowing more uniform pre-sodiation of the electrode.

X-ray powder diffraction patterns of the sodium powder and sodium foil are shown in FIG. 1E. The peaks below 27° two theta can be attributed to the Kapton insulating tape and the glass slide used to seal the samples. Both sodium powder and sodium foil exhibit characteristic sodium peaks of (110), (200), (211), (310), and (222), and are in agreement with reference XRD pattern of metallic sodium (PDF #22-0948). Moreover, the XRD pattern of sodium powder displays one more peak at 38.20 that could be correlated to the (111) peak of sodium hydroxide (PDF #35-1009). The presence of NaOH may originate from the reaction between metallic sodium and trace water presented in hexane or potential air penetration into the sample holder during XRD analysis. Moreover, differential scanning calorimetry (DSC) analysis of the sodium powder and sodium metal reference were conducted in the range of 40° C. to 250° C. to further examine their physical properties. All samples were first loaded into hermetically sealed DSC crucibles inside glovebox before transferring to the DSC analyzer. As shown in FIG. 1F, both sodium powder and sodium reference exhibit only one single endothermic peak with matching onset and maximum temperatures, indicating the presence of metallic sodium within the sodium powder. However, the heat of fusion (melting) for sodium powder is about 20% lower than bulk sodium reference, suggesting the presence of fine sodium particles or possible low-level NaOH impurities in sodium powder.

Preparation of Carbon Electrodes: Glucose (Sigma Aldrich) was pyrolyzed under continuous argon flow inside a tube furnace held at 1100° C. for 6 hours to yield turbostratic carbon. The initial heating rate was 5° C./min. The glucose derived carbon was then handmilled for 15 mins using mortar and pestle and identified as "GC1100". To prepare the anode laminate, 90 wt % of GC1100, 3 wt % of Super P carbon black, and 7% of sodium carboxymethyl cellulose (Na-CMC) were first homogenized in water and then casted onto a copper foil using doctor blade processing technique. The laminate was dried at 100° C. overnight inside a vacuum oven, and then punched into 12 mm disks for coin cell testing.

Preparation of $NaCrO_2$ Electrodes: Stoichiometric amount of $Na_2CO_3$ and $Cr_2O_3$ was first ballmilled for 15 min and pelletized using a KBr pellet press. The pellets were then heat treated at 900° C. in argon for 5 hours to obtain the $NaCrO_2$ powder. The $NaCrO_2$ laminate was prepared by first mixing 80 wt % of $NaCrO_2$, 10% PVDF; and 10% Super P carbon black in appropriate amount of n-methyl-2-pyrrolidone (NMP) and then casting the slurry onto aluminum foil using doctor blade. Upon overnight vacuum drying, the laminate was punched into 12 mm electrodes.

Figure 7:
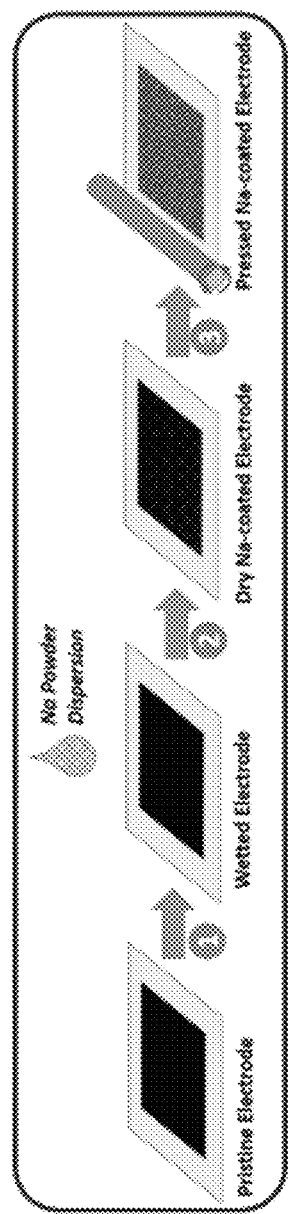
FIG. 7 is a schematic representation of the process of this disclosure for application of sodium powder onto an electrode (e.g. carbon anode or sodium containing cathode).

Pre-sodiation of Carbon Anode: To prepare the sodium powder treated carbon electrodes inside the glovebox, sodium powder dispersed in hexane was added onto the carbon electrodes dropwise until targeted amount of sodium was deposited. The sodium coated electrodes were then vacuum dried inside the glovebox antechamber for 10 minutes to remove hexane. Once dried, a grey coating would appear on the surface of the black electrodes. These electrodes would then be pressed to 1000 PSI to ensure good contact between the sodium powder and the carbon. FIG. 7 is a schematic representation of the process of this disclosure for application of sodium powder onto an electrode. This electrode could be an anode such as a carbon anode or a cathode such as a sodium containing cathodes such as, but not limited to, $NaFePO_4$, $Na_2FePO_4F$, $Na_{1.5}VPO_{4.8}F_{0.7}$, $Na_xMgyMn_zO_2$, $Na_xCoO_2$, $Na_4Co_3(PO_4)_2(P_2O_7)$, $Na_4Fe(CN)_6$, $NaNiO_2$, $Na_3Ti_2(PO_4)_3$ and some organic cathodes such as, but not limited to $C_4C_8H_2O_6$. Material Characterization: X-ray powder diffraction pattern of the prepared sodium powder and sodium foil were collected from 30 to 800 two Theta at 1°/min scan rate using Rigaku Smartlab XRD with a Cu Kα radiation source. To prevent sample degradation, Kapton tape was used to fully seal the sodium samples inside glovebox before transferring to the ambient environment for measurement. Scanning electron microscopy (SEM) images and corresponding energy-dispersive x-ray (EDX) mapping of the Na powder were taken using an FEI Nova 200 NanoLab Dualbeam TM-SEM/FIB. The powder was pre-deposited onto a SEM stub with carbon tape inside the glovebox; the stub was then enclosed in a glass vial filled with argon gas for transportation. The stub was briefly (~10s) exposed to air during the SEM sample loading procedure. SEM images and corresponding EDX mapping of GC1100 electrodes were taken using Joel Neoscope benchtop SEM. Differential scanning calorimetry (DSC)

measurements were carried out in TA DSC-Q20; the temperature range is 25-250° C. at a scan rate is 5° C./min.

Electrochemical Testing: For half-cell testing, CR2032 coin cells were constructed using the prepared GC 1100 electrodes (with and without sodium powder addition) or $NaCrO_2$ electrodes as the working electrode, a Na foil as the counter electrode, and a Whatman glassfiber as the separator. IM of $NaClO_4$ in propylene carbonate (PC) was used as electrolyte for the half-cell study. The voltage window is 1 mV to 2V for anode cycling and 2.5V to 3.6V for cathode study. For the full-cell study, $NaCrO_2$ and GC1100 electrodes were assembled together in the coin cells with the similar configuration. The electrolyte used is IM Sodium hexaflurophospahete ($NaPF_6$) dissolved in PC with 3 vol % FEC. The cathode to anode capacity ratio was maintained at about 1.0 for this study. All battery cycling was conducted using an Arbin cycler.

Evaluation of Sodium Powder in Half Cells: Electrochemical reactivity of sodium powder was first verified by cycling GC1100 electrodes against different counter sodium electrodes made of unpressed Sodium Powder, pressed Sodium Powder, and Na metal foil. The cycling results indicate that Sodium Powder is able to provide sodium to sodiate the GC1100 carbon and the pressing procedure is important to improve cycling capacity of Sodium Powder by enhancing electric contact between Sodium Powder particles and preventing Sodium Powder particles from dispersing in the electrolyte solution.

Figure 2D:
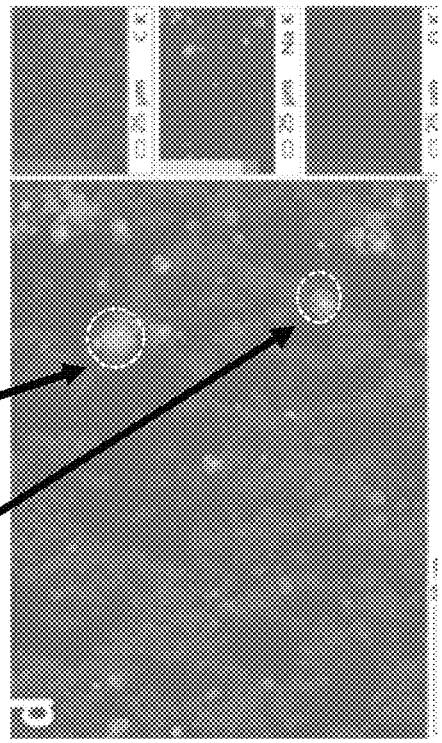
FIGS. 2C and 2D show SEM image and EDX mapping of the image respectively for GC1100 electrode coated with sodium powder.
Figure 2C:
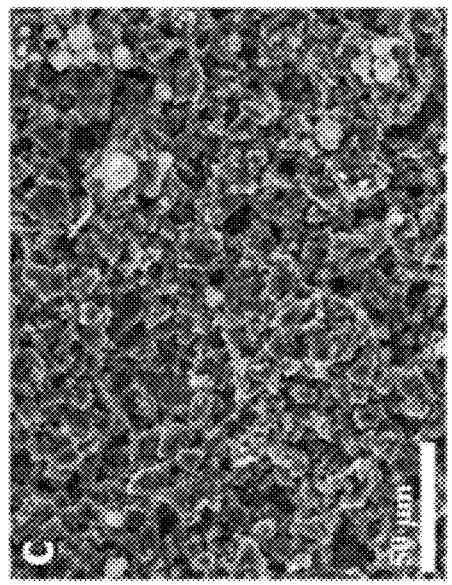

To evaluate the effectiveness of prepared sodium powder as electrode additives, CR2032 coin cells containing sodium powder coated carbon electrodes and sodium foil counter electrodes were cycled and compared against the performance of uncoated carbon electrodes. IM of $NaClO_4$ dissolved in propylene carbonate (PC) was used as electrolyte and a piece of Whatman glassfiber was used as the separator. FIGS. 2A through 2D illustrate the changes on GC1100 electrodes before and after sodium powder coating process. FIGS. 2A and 2B show GC 1100 electrode with and without sodium powder coating respectively. Referring to FIG. 2B, the presence of Sodium Powder could be easily observed on the surface of the coated electrode. FIGS. 2C and 2D show SEM image and EDX mapping of the image respectively for GC1100 electrode coated with sodium powder. Referring to FIGS. 2C and 2D, it can be seen that some sodium powder particles that are sufficiently smaller than the electrode porosity are also embedded in the electrode matrix beneath the surface. The right panel of images in FIG. 2D confirms the presence of C, Na and O in the electrode confirming that indeed sodium powder is loaded on the carbon electrode. The presence of Na is depicted with bright white area.

Figure 3A:
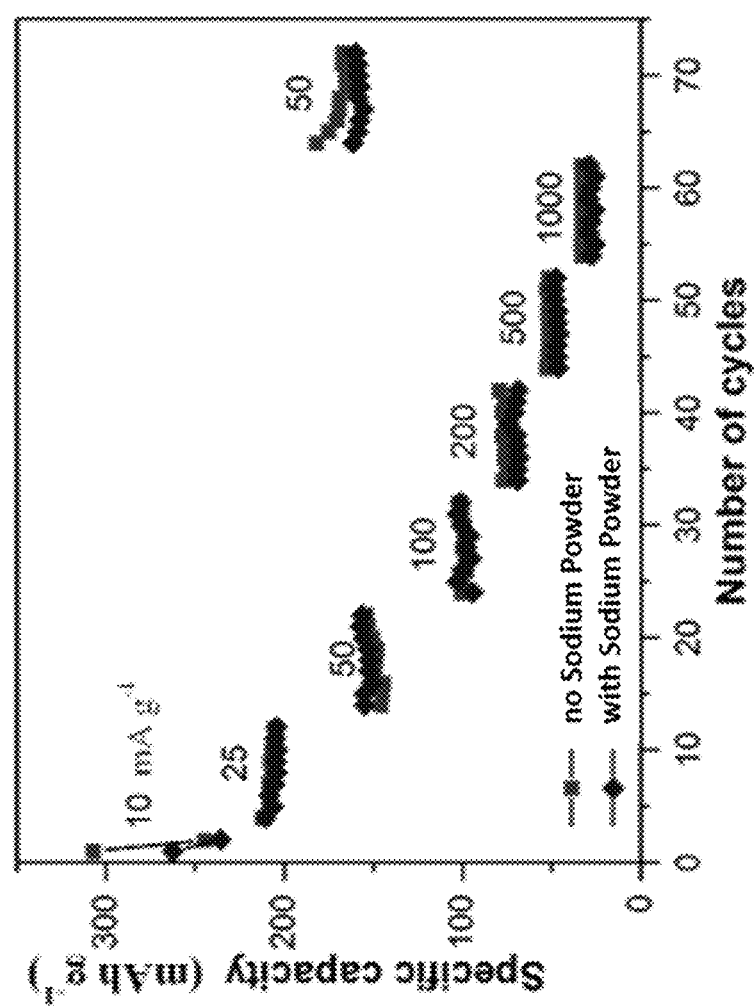
FIG. 3A shows rate studies of SIB half-cells in the voltage window of 1 mV to 2V GC1100 electrodes with and without sodium powder coating.
Figure 3C:
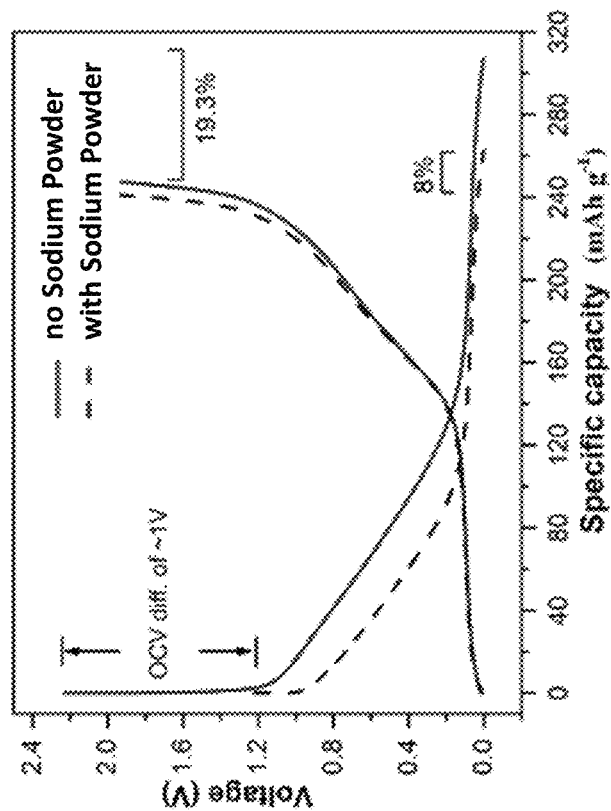
FIGS. 3B and 3C show $1^{st}$ and $2^{nd}$ cycle voltage profiles respectively of GC 1100 electrodes with and without sodium powder coating in SIB half cells in the voltage window of 1 mV to 2V.
Figure 3B:
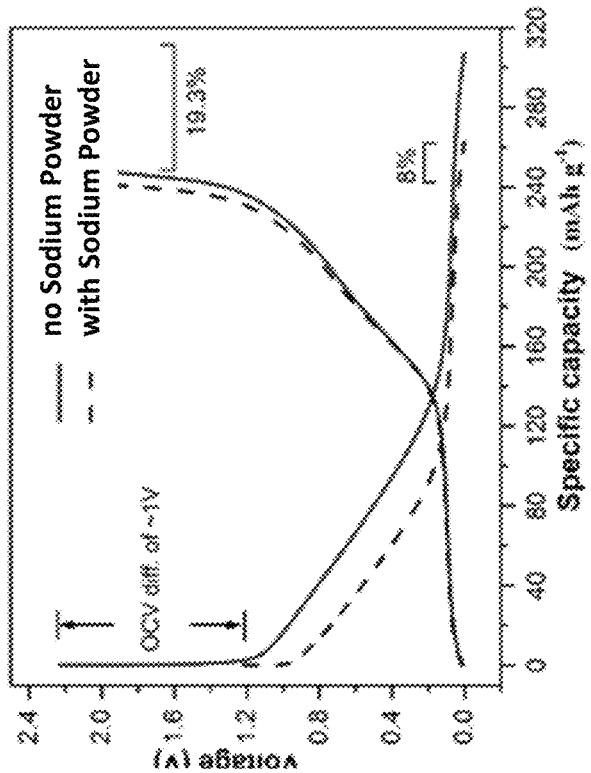

The cell cycling results are summarized in FIGS. 3A through 3C. FIG. 3A shows rate studies of SIB half-cells in the voltage window of 1 mV to 2V GC 1100 electrodes with and without sodium powder coating. FIGS. 3B and 3C show $1^{st}$ and $2^{nd}$ cycle voltage profiles respectively of GC1100 electrodes with and without sodium powder coating in SIB half cells in the voltage window of 1 mV to 2V. Referring to FIG. 3A, it can be seen that both coated and uncoated GC1100 half cells delivered comparable specific capacities (e.g. 205 mAh $g^{-1}$ at 25 mA $g^{-1}$, and 30 mAh $g^{-1}$ at 1000 mA $g^{-1}$) during the rate study. The key difference lays in the $1^{st}$ discharge and charge (FIGS. 3B and 3C). Before the actual cycling of cells, both cells were aged for 10 hours to allow them to reach a stable open circuit voltage (OCV). As illustrated in FIG. 3B, OCV of the Sodium Powder-coated cell is about 1V lower than the uncoated cell, suggesting partial sodiation of the active material (presodiated carbon exhibits lower voltage potentials) during the aging process. Moreover, the $1^{st}$ cycle irreversible capacity loss is significantly improved from 19.3% (uncoated) to 8% (coated). In full cells, such improvement in the $1^{st}$ cycle loss would translate to a reduction of "sacrificial" cathode active materials and an increase in specific cell capacity. During the $2^{nd}$ cycle, the voltage profiles of both cells overlap with each other, indicating no changes in the sodiation/desodiation mechanism of the carbon after the first cycle.

Figure 4A:
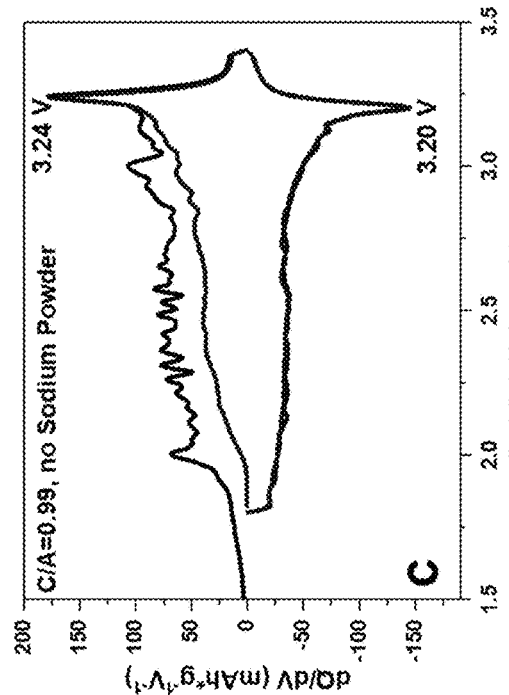
FIGS. 4A and 4B show first two cycles of differential capacity voltage profile (dQ/dV) plots of GC 1100//Na reference, and $NaCrO_2$//Na reference respectively.
Figure 4B:
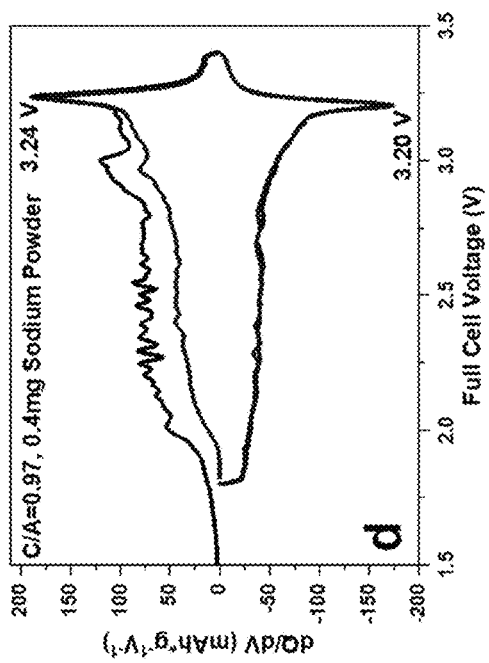
Figure 4C:
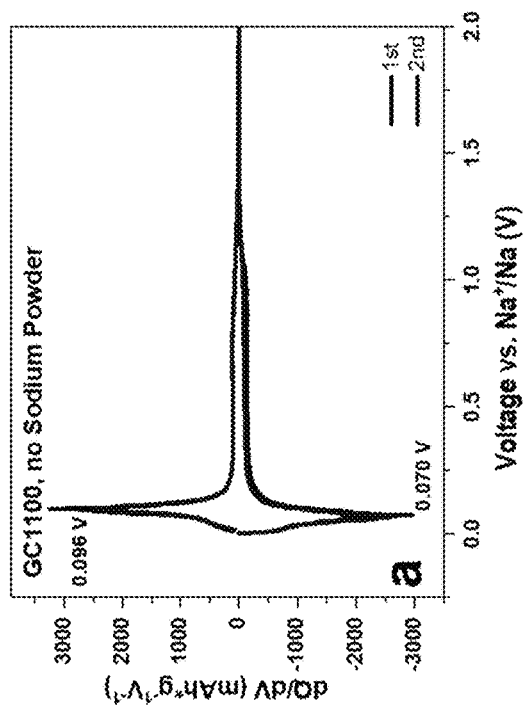
FIGS. 4C and 4D show first two cycles of differential capacity voltage profile (dQ/dV) plots of GC1100//$NaCrO_2$ full cells with and without sodium powder addition.
Figure 4D:
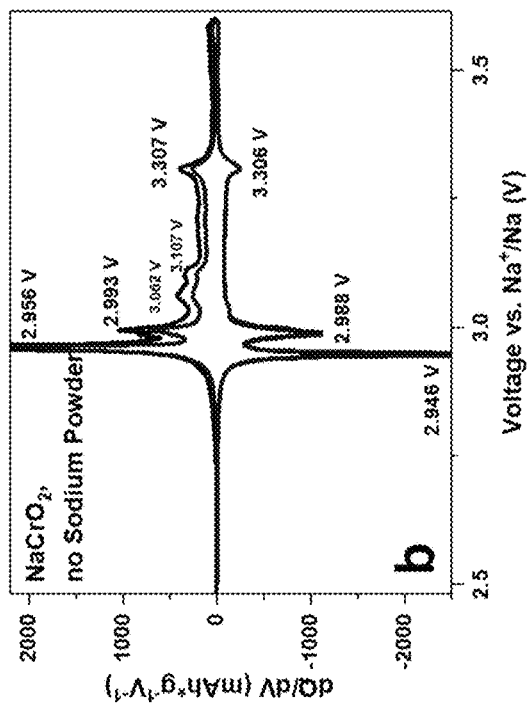

Evaluation of Sodium Powder in Full Cells: To evaluate the impact of sodium powder on full cell cycling, GC1100 anodes and $NaCrO_2$ cathodes were paired in coin cells with cathode to anode capacity ratio of approximately 1. The cycling voltage window was limited from 1.8V to 3.4V. The electrolyte used was IM $NaPF_6$ dissolved in PC with 3 vol % FEC. The first two cycles of the differential capacity voltage profile for GC1100//Na, $NaCrO_2$//Na, and GC1100//$NaCrO_2$ full cells with and without Sodium Powder are summarized in FIGS. 4A through 4D. FIGS. 4A and 4B show first two cycles of differential capacity voltage profile (dQ/dV) plots of GC 1100//Na reference, and $NaCrO_2$//Na reference respectively. Both GC1100 and $NaCrO_2$ exhibit rather symmetrical dq/dv profiles (FIGS. 4A and 4B), which are reflected in the symmetrical dq/dv plots of the full cells (FIGS. 4C and 4D). The major charge and discharge peaks at 3.24 V and 3.20V, respectively, are identical for both cells. The lack of significant difference between the full-cell dQ/dV plots despite the addition of 0.4 mg sodium powder in the cell suggests no adverse effect of Sodium Powder on cycling behavior of full cells.

Figure 5A:
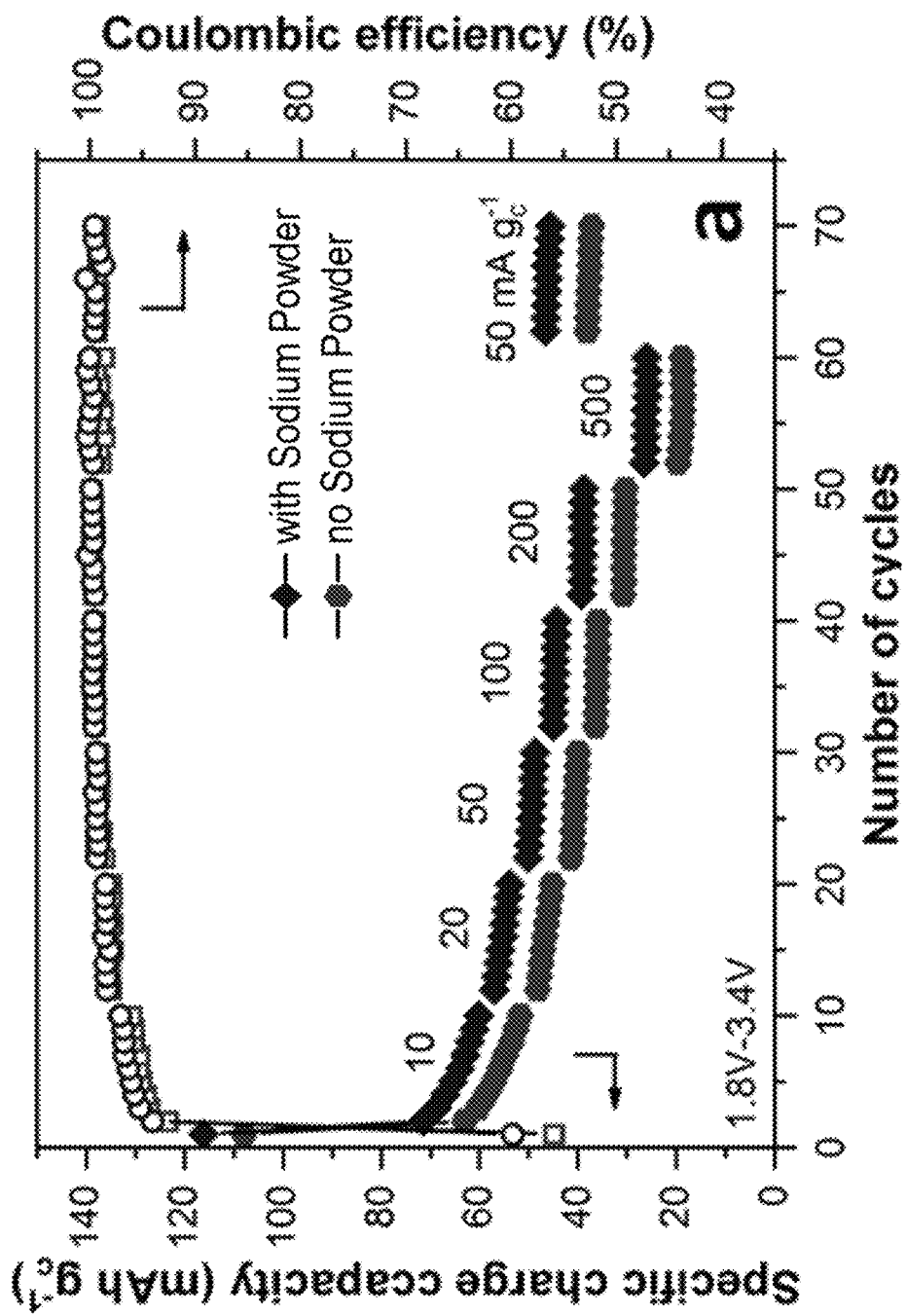
FIG. 5A shows rate capability study of GC1100//$NaCrO_2$ full cells cycled between 1.8V and 3.4V showing positive impact of sodium powder addition.
Figure 5B:
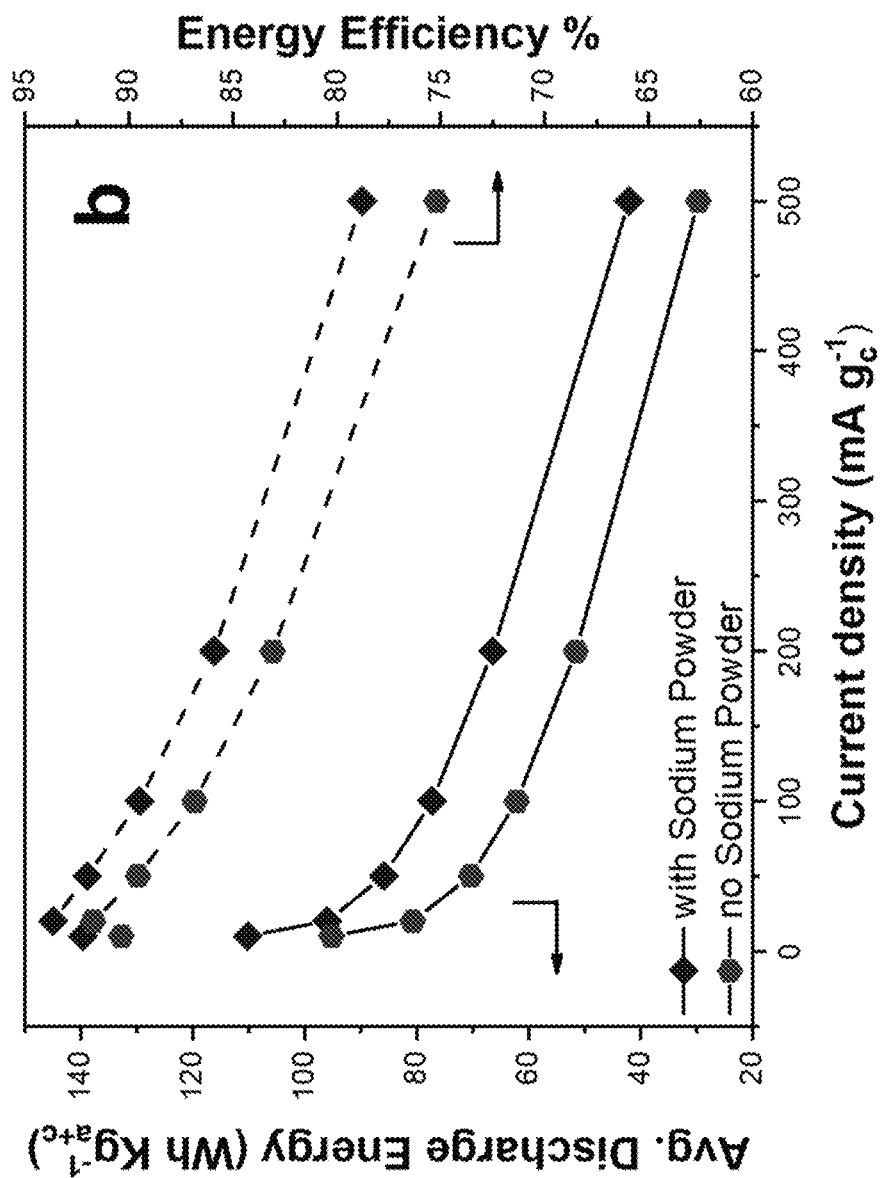
FIG. 5B shows average discharge energy density and energy efficiency of GC1100//$NaCrO_2$ full cells cycled between 1.8V and 3.4V showing positive impact of sodium powder addition.
Figure 5C:
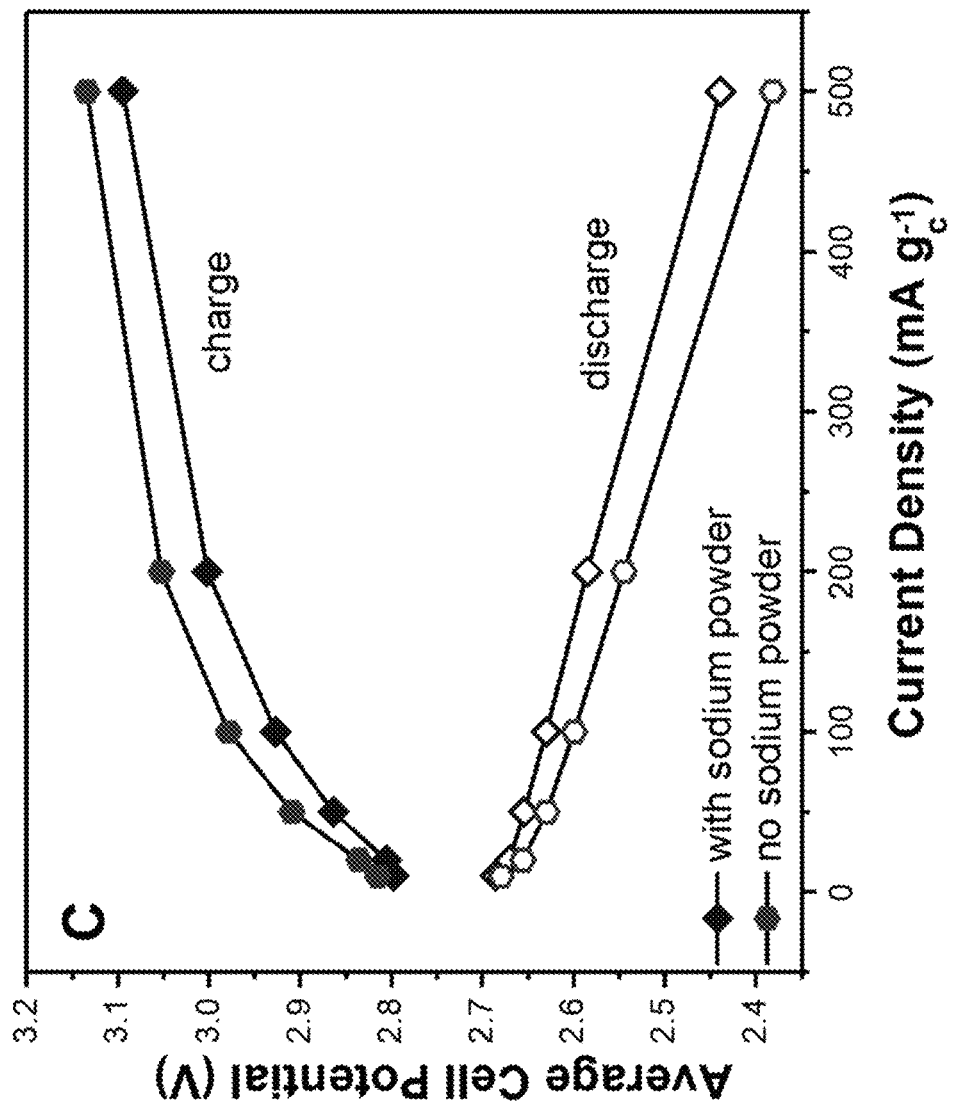
FIG. 5C shows average cell potentials as a function of current density for GC1100//$NaCrO_2$ full cells cycled between 1.8V and 3.4V showing positive impact of sodium powder addition.
Figure 5D:
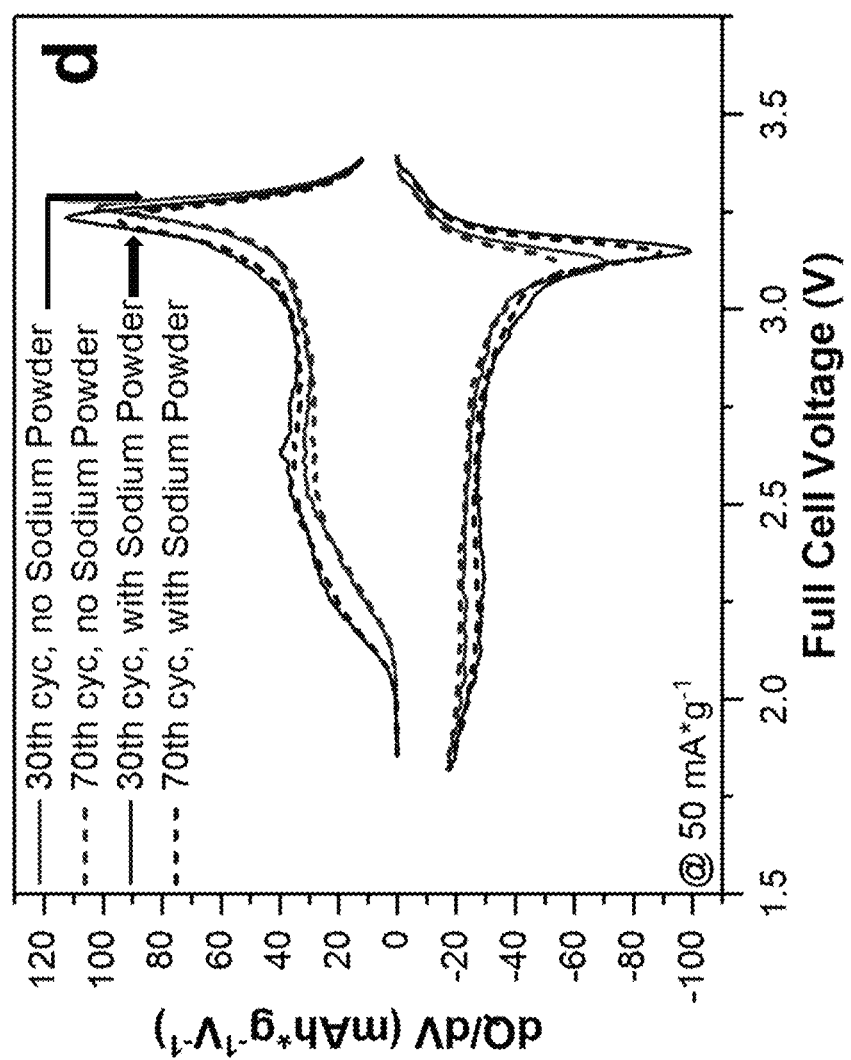
FIG. 5D shows differential capacity voltage plots of the $30^{th}$ and $70^{th}$ cycles @at 50 $mA*g_c^{-1}$ for GC1100//$NaCrO_2$ full cells cycled between 1.8V and 3.4V showing positive impact of sodium powder addition.

FIGS. 5A through 5D summarize the rate capability study of the full cells. FIG. 5A shows rate capability study of GC1100//$NaCrO_2$ full cells cycled between 1.8V and 3.4V showing positive impact of sodium powder addition. FIG. 5B shows average discharge energy density and energy efficiency of GC1100//$NaCrO_2$ full cells cycled between 1.8V and 3.4V showing positive impact of sodium powder addition. FIG. 5C shows average cell potentials as a function of current density for GC1100//$NaCrO_2$ full cells cycled between 1.8V and 3.4V showing positive impact of sodium powder addition. FIG. 5D shows differential capacity voltage plots of the $30^{th}$ and $70^{th}$ cycles @at 50 mA*$g_c^{-1}$ for GC1100//$NaCrO_2$ full cells cycled between 1.8V and 3.4V showing positive impact of sodium powder addition. The low first cycle Coulombic efficiency of the full cells can be attributed to the low $1^{st}$ cycle CE (~55%) of the $NaCrO_2$ cathode. Further optimization effort could improve Coulombic efficiency of the $NaCrO_2$ cathode and the full cells. Nonetheless, it is clear that the $1^{st}$ cycle Coulombic efficiency of the pre-sodiated cell is higher than the reference cell (60% vs. 56%) as shown in FIG. 5A. And the overall cell capacity also exhibits about 10% improvement at all cycling rates (10, 20, 50, 100, 200, 500, and 10 mA $g_c^{-1}$) after Sodium Powder addition. Both improvements in $1^{st}$ cycle CE and overall capacity can be ascribed to the addition of Sodium Powder, which partially pre-sodiates the GC 1100 anode and provides additional sodium source for continuous cycling. Another key benefit of Sodium Powder addition is the improvement of two important full-cell parameters: discharge energy density (which is the multiplication of capacity and voltage) and energy efficiency (the ratio of discharge energy over charge energy). As shown in FIG. 5B, the cell with Sodium Powder addition exhibits about 15 Wh/$kg_{a+c}$ more energy density and about 5% more energy efficiency than the control cell. The improvement in these parameters can be attributed to the reduction in cell polarization (which is defined as the difference between average charge and discharge potentials) in the pre-sodiated cell as shown in FIG. 5C. Such polarization likely originates from the shift of electrode potential windows (both cathode and anode) in a full cell due to unfavorable electrochemical side reactions that consume available alkaline ions. With the additive of sodium powders, the cell polarization is mitigated leading to better cycling performance. Differential capacity voltage plots of both cells at 50 mA $g_c^{-1}$ for cycles #30 and #70 are shown in FIG. 5D. In comparison to the Sodium Powder coated cell, the broadening of charge and discharge peaks and the larger reduction in peak intensity ($30^{th}$ vs. $70^{th}$) in uncoated cell provide further evidence of electrode degradation due to the depletion of available sodium.

Thus, based on the above description, it can be stated that fine sodium powder with particle size in the range of 2-16 m have been successfully synthesized via pulsed ultrasonic dispersion of molten sodium in mineral oil. X-ray powder diffraction reveals the purity of sodium power with minor sodium hydroxide impurity originated from trace amount of moisture in hexane. When dispersed in hexane or other volatile organic mediums, fine sodium powder can be easily applied onto carbon electrodes by simple drop-casting technique. Mechanical compression of the NaP-coated electrodes is found to be beneficial to activate the sodium powder. With the addition of sodium powder, GC 1100 electrodes show reduction in $1^{st}$ cycle capacity loss. In GC1100//NaCrO$_2$ full cells, the addition of NaP on anode improves the $1^{st}$ cycle Coulombic efficiency, overall reversible capacity, cell energy density, and energy efficiency. The improvement in CE and capacity is attributed to the presence of additional Na source, while the improvement in energy density and efficiency can be attributed to the reduction in cell polarization and the mitigation of electrode degradation. Overall, the use of sodium powder as electrode additives has shown promising enhancement in cycling performance. Reducing impurity contents in sodium powder and stabilizing sodium powder in air should yield further improvement in cell performance. Stabilization is the formation of a passivation layer on the surface of sodium particles to prevent exposure to air and moisture. It could be done by reacting the pristine sodium powder with an organofluorine compound to form a sodium fluoride and polymer coating on the particle surface.

Based on the above description, it is an objective of this disclosure to describe a method of producing metallic sodium powders. The method includes immersing at least one solid piece of sodium metal in an organic liquid comprising a hydrocarbon oil; subjecting the at least one solid piece of sodium metal immersed in the hydrocarbon oil to ultrasonic irradiation for a period of time, wherein the solid piece of sodium metal is fragmented to form sodium powder, resulting in a dispersion of the sodium powder in the organic liquid, and separating the sodium powder from the organic liquid by a separation technique, resulting in metallic sodium powder. In some embodiments of the method, the at least one solid piece of sodium can be two or more. Examples of the organic liquid comprising a hydrocarbon oil include but not limited to mineral oil, toluene, and alkanes with 2-20 carbon atoms. Separation techniques that can be used in the method include but not limited to centrifuging, evaporation, and filtration. In some embodiments of the method, any residual organic liquid on the sodium powder is removed using a solvent capable of dissolving the organic liquid, and then removing the solvent by a phase separation technique. A non-limiting range for the particle size of the metallic sodium powders produced by the methods of this disclosure is 1 nm-100 micrometers. In some embodiments of the methods of this disclosure, the ratio of mass in grams of sodium metal to volume of the organic liquid in liters is in the non-limiting range of 1-10. The period of ultrasonic irradiation time is in the non-limiting range of 1-10 min. In the methods of this disclosure to produce sodium powders, the frequency of ultrasonic radiation is in the range of 10-100 kHz.

In some embodiments of the above method, an additional step is included. This additional step includes adding at least one element or from groups 13 and 14 of the periodic table of elements during the ultrasonic irradiation, wherein the resulting metallic sodium powder contains the element. In some embodiments of the method, the additional step can including adding one or more oxides of elements from groups 13 and 14 of the periodic table of elements during the ultrasonic irradiation, wherein the resulting metallic sodium powder contains the oxide of the element or the oxides of the elements from groups 13 and 14 of the periodic table of elements. Examples of such elements include but not limited to tin, antimony, germanium, and silicon. Example of oxides that can be added some embodiments of the method include but not limited tin oxide and antimony oxide.

It is another objective of this disclosure to describe sodium metal particles comprising a passivation layer of an alloy of sodium with at least one element from groups 13 and 14 of the periodic table of elements.

It is yet another objective of this disclosure to describe sodium metal particles comprising a passivation layer of an oxide of at least one element from groups 13 and 14 of the periodic table of elements.

It is another objective of this disclosure to describe a method of sodiation of an anode in an electrochemical cell comprising adding sodium metal powders to the surface of the anode either as a dry powder or as a suspension of the sodium particles in an organic liquid.

It is yet another objective of this disclosure to describe an anode in an electrochemical cell containing metallic sodium particles It is another objective of this disclosure to describe an electrochemical cell comprising a presodiated anode. In some embodiments of the electrochemical cell comprising a presodiated anode, the weight percentage sodium in the presodiated anode prior to an electrochemical reaction in the cell is in the non-limiting range of 5-20.

The invention has been described in detail with particular reference to certain preferred aspects thereof, but it will be understood that variations, combinations, and modifications can be effected by a person of ordinary skill in the art within the spirit and scope of the invention. Other implementations may be possible. It is therefore intended that the foregoing detailed description be regarded as illustrative rather than limiting. Thus, this disclosure is limited only by the following claims.

The invention claimed is:

1. A method of producing metallic sodium powders, the method comprising:
   immersing at least one solid piece of sodium metal in an organic liquid comprising a hydrocarbon oil;
   subjecting the at least one solid piece of sodium metal immersed in the hydrocarbon oil to ultrasonic irradiation for a period of time, wherein the solid piece of sodium metal is fragmented to form sodium powder, resulting in a dispersion of the sodium powder in the organic liquid; and separating the sodium powder from the organic liquid by a separation technique, resulting in metallic sodium powder.

2. The method of claim 1, wherein the organic liquid comprising a hydrocarbon oil is one of mineral oil, toluene, and alkanes with 2-20 carbon atoms.

3. The method of claim 1, wherein the separation technique is one of centrifuging, evaporation, and filtration.

4. The method of claim 3, further comprising steps of removing any residual organic liquid on the sodium powder using a solvent capable of dissolving the organic liquid, and removing the solvent by a phase separation technique.

5. The method of claim 1, wherein the resulting metallic sodium powder has particle size in the range of 1 nm-100 micrometers.

6. The method of claim 1, wherein the ratio of mass in grams of sodium metal to volume of the organic liquid in liters is in the range of 1-10.

7. The method of claim 6, wherein the period of time is in the range of 1-10 min.

8. The method of claim 1, wherein frequency of ultrasonic radiation is in the range of 10-100 kHz.

9. The method of claim 1, further comprising adding at least one element from groups 13 and 14 of the periodic table of elements during the ultrasonic irradiation, wherein the resulting metallic sodium powder contains the element.

10. The method of claim 9, wherein the at least one element is one of tin, antimony, germanium, and silicon.

11. The method of claim 1, further comprising adding an oxide of at least one element from groups 13 and 14 of the periodic table of elements during the ultrasonic irradiation, wherein the resulting metallic sodium powder contains the oxide.

12. The method of claim 11, wherein the at least one oxide is one of tin oxide or antimony oxide.

* * * * *